United States Patent [19]

Perrier et al.

[11] Patent Number: 5,408,350
[45] Date of Patent: Apr. 18, 1995

[54] BIDIRECTIONAL TRANSMISSION SYSTEM, ESPECIALLY ONE USING OPTICAL FIBER, EMPLOYING A SINGLE CARRIER FOR BOTH TRANSMISSION DIRECTIONS

[75] Inventors: Philippe Perrier, Paris; Olivier Gautheron, Palaiseau, both of France

[73] Assignee: Alcatel Cit, Paris, France

[21] Appl. No.: 309,603

[22] Filed: Sep. 21, 1994

Related U.S. Application Data

[63] Continuation of Ser. No. 955,999, Oct. 2, 1992.

[30] Foreign Application Priority Data

Oct. 4, 1991 [FR] France .................. 91 12263

[51] Int. Cl.⁶ ........................... H04B 10/00
[52] U.S. Cl. ...................... 359/168; 359/113
[58] Field of Search ............. 359/168–170, 359/113

[56] References Cited

U.S. PATENT DOCUMENTS

| | | | |
|---|---|---|---|
| 3,584,220 | 6/1971 | Sadao Non | 359/169 |
| 3,943,284 | 3/1976 | Nelson . | |
| 3,989,942 | 11/1976 | Waddoups | 359/170 |
| 4,763,326 | 8/1988 | Krick | 370/110.4 |
| 4,955,086 | 9/1990 | Kindt | 359/170 |
| 4,956,877 | 9/1990 | Kroll | 359/168 |
| 5,010,586 | 4/1991 | Mortimore | 359/169 |

FOREIGN PATENT DOCUMENTS

| | | |
|---|---|---|
| 0227164 | 7/1987 | European Pat. Off. . |
| 2558025 | 7/1985 | France . |
| 2196809 | 5/1988 | United Kingdom . |
| 8706084 | 10/1987 | WIPO . |

Primary Examiner—Leslie Pascal
Attorney, Agent, or Firm—Sughrue, Mion, Zinn, Macpeak & Seas

[57] ABSTRACT

This bidirectional transmission system, especially one using optical fiber, between a source terminal and a user terminal employing a single carrier for both transmission directions obtained from a source in the source terminal characterized in that it comprises for each transmission direction means for modulating one parameter of said carrier, this parameter being intensity for the two directions and subject in all cases to the condition that the modulation applied first for transmission in the downward direction from the source terminal to the user terminal the depth of modulation is sufficiently high to leave sufficient power for application of the second modulation to which that applied second can be applied for transmission in the upward direction from the user terminal to the source terminal.

5 Claims, 7 Drawing Sheets

BIDIRECTIONAL TRANSMISSION SYSTEM, ESPECIALLY ONE USING OPTICAL FIBER, EMPLOYING A SINGLE CARRIER FOR BOTH TRANSMISSION DIRECTIONS

This is a continuation of application No. 07/955,999 filed Oct. 2, 1992.

BACKGROUND OF THE INVENTION

1. Field of the Invention

The present invention concerns a bidirectional transmission system, especially one using optical fiber, employing a single carrier for both transmission directions.

The present invention cad be used among other things to provide bidirectional transmission on a link, especially an optical fiber link, between two equipments of the link (called terminals) when one of these terminal equipments (called a user terminal) must be as simple as possible and in particular must not incorporate any carrier source, especially any optical carrier source.

A user terminal of this kind may be a subscriber terminal of a telecommunication network such as the telephone network, for example, especially in the context of connecting subscribers to the network using optical fiber. This application will be taken by way of specific example in what follows.

2. Description of the Related Art

Various techniques have been considered for providing bidirectional transmission via optical fiber between subscriber terminals and their local telephone network central office.

For each of the techniques mentioned below, only one connection need be considered (between a subscriber and the central office), even if a set of subscribers can be connected to the central office by the same link, in particular by multiplexing.

Figure 1:
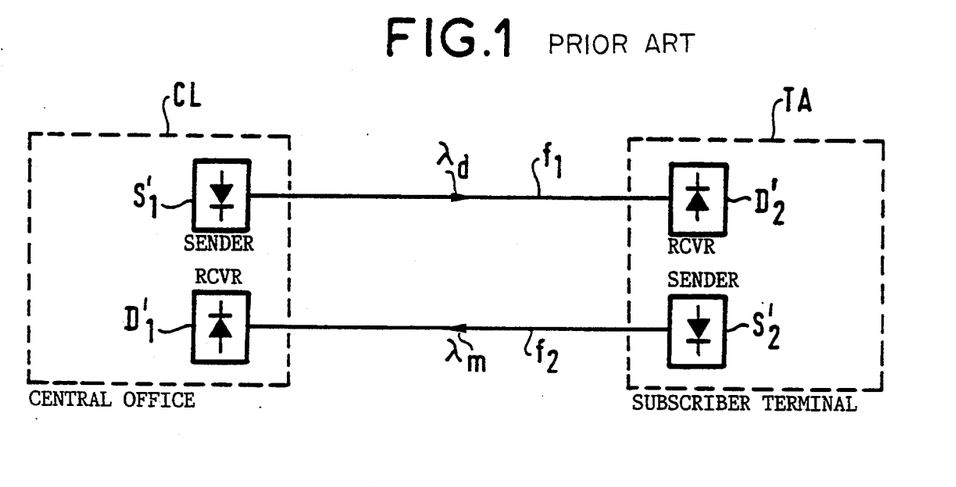
FIG. 1 is a diagram of a prior art bidirectional transmission system.

FIG. 1 summarizes a first technique.

In this technique the central office CL and the subscriber terminal TA are connected by two optical fibers and information is transmitted from the central office to the subscriber (this is called the downward direction) on a fiber $f_1$ separate from the fiber $f_2$ on which information is transmitted from the subscriber to the central office (this is called the upward direction).

The drawbacks of this first technique are the duplication of all the transmission equipments (two optical senders $S'_1$, $S'_2$ each comprising an optical source, two optical fibers $f_1$, $f_2$ and two optical receivers $D'_1$, $D'_2$) and the presence of an optical source at the subscriber terminal.

Figure 2:
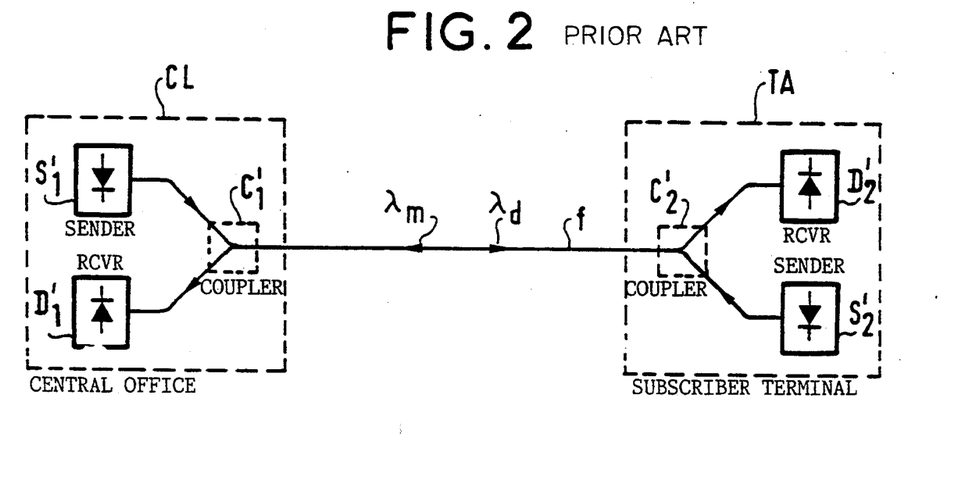
FIG. 2 is a diagram of a prior art bidirectional transmission system utilizing a single optical transmission fiber.

A second technique summarized in FIG. 2 and described in the document IEEE Global Telecommunications Conference, H. Kobrinski, L. S. Smoot, and T. J. Robe, "A passive photonic loop architecture employing wavelength-division multiplexing" uses the great bandwidth of optical fiber to provide bidirectional transmission on a single fiber f between the central office CL and the subscriber terminal TA. In addition to the optical senders $S'_1$, $S'_2$ and the optical receivers $D'_1$, $D'_2$ optical couplers $C'_1$, $C'_2$ are then required to distinguish between the two transmission directions, respectively that to the central office and that to the subscriber terminal. Two wavelengths may be assigned to a call, a wavelength $\lambda_d$ for the downward direction and a wavelength $\lambda_m$ for the upward direction. Because of the nature of light, the same wavelength may be used for both transmission directions, however, as described in the document Electronic Letters, Vol. 20, No. 18, pp. 722-723, 1984, A. P. McDonna, D. J. McCartney, and D. B. Mortimore, "1.3 μm bidirectional optical transmission over 31 km of single-mode fibre using optical couplers". The major disadvantage of this type of technique is again the presence of an optical source in the subscriber terminal.

A so-called "ping-pong" variant of the second technique reserves some timeslots for transmission in the upward direction and other timeslots for transmission in the downward direction. Various drawbacks are then incurred over and above the one mentioned above:

simultaneous transmission in both directions is not possible;

synchronization of transmission times allowing for the propagation times between the central office and the subscriber is required.

As previously mentioned, a system which uses an optical carrier generated at the user terminal is unattractive, especially for a subscriber connection system, for two reasons:

The wavelength assigned to transmission in the upward direction must be controlled to minimize interference with other calls, whether or not it is different from that used for transmission in the downward direction.

It is difficult to guarantee wavelength stability because of the distance between subscribers and between each subscriber and the central office.

The use of specific wavelengths for transmission in the upward direction requires each subscriber to have a different send equipment (including an optical source) compatible with the receive equipment at the central office.

A technique for dispensing with an optical source at the subscriber terminal described in the document Electronic Letters, Vol. 23, No. 18, pp. 943-944, 1987, H. Kobrinski and S. S. Cheng, "Laser power sharing in the subscriber loop" is summarized in FIG. 3.

Figure 3:
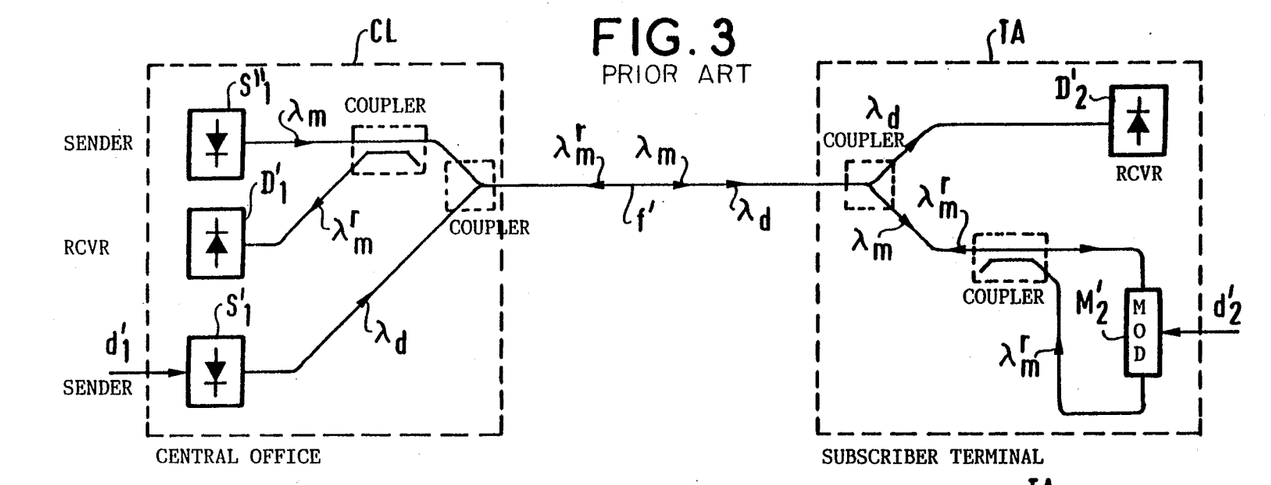
FIG. 3 is a diagram of a prior art bidirectional transmission system utilizing laser power sharing in the subscriber loop.

As in the previous techniques, data $d'_1$ from the central office is transmitted to the subscriber by modulating an optical carrier of wavelength $\lambda_d$ from an optical source in a sender $S'_1$. For transmission in the upward direction another optical source $S''_1$ in the central office sends to the subscriber on the same fiber f' a carrier at a wavelength $\lambda_m$ different than $\lambda_d$. Using a modulator $M'_2$ the subscriber modulates this optical carrier with the data $d'_2$ to be sent. The modulated optical carrier, which is still at the wavelength $\lambda_m$ although this wavelength is now denoted $\lambda^r{}_m$ (r=relayed) is relayed, in this example over the same fiber, to the central office.

In a system based on this technique the absence of any optical source at the subscriber terminal eliminates the need for wavelength control between all network subscribers. Control of the light sources at the central office is still required, however, but this is easier to implement because the sources are all located in the central office. However, a system of this kind has the drawback of requiring two optical sources rather than one source at the central office.

A variant of this technique using a single optical carrier is described in the document Electronics Letters, Vol. 22, No. 10, pp. 528-529, 1986, T. H. Wood, E. C. Carr, B. L. Kasper, R. A. Linke, C. A. Burus and K. L. Walker, "Bidirectional fibre-optical transmission using a multiple-quantum-well (MQW) modulator/detector". This variant uses a common component for modulation and detection at the subscriber terminal.

This component cannot function simultaneously as a modulator and as a detector, however, so that transmission in the upward direction cannot take place at the same time as transmission in the downward direction.

A technique enabling simultaneous bidirectional transmission of optical signals between a subscriber and a central office using a single optical carrier described in the document Conference on Optical Fiber Communication (Atlanta, Ga., U.S.A., 24–26 February 1986), Technical Digest, paper MH4, pp. 14–15, P. J. Duthie, M. J. Wale, J. Hankey, M. J. Goodwin, W. J. Stewart, I. Bennion and A. C. Carter, "Simultaneous bidirectional fiber-optic transmission using a single source" is summarized in FIG. 4.

Figure 4:
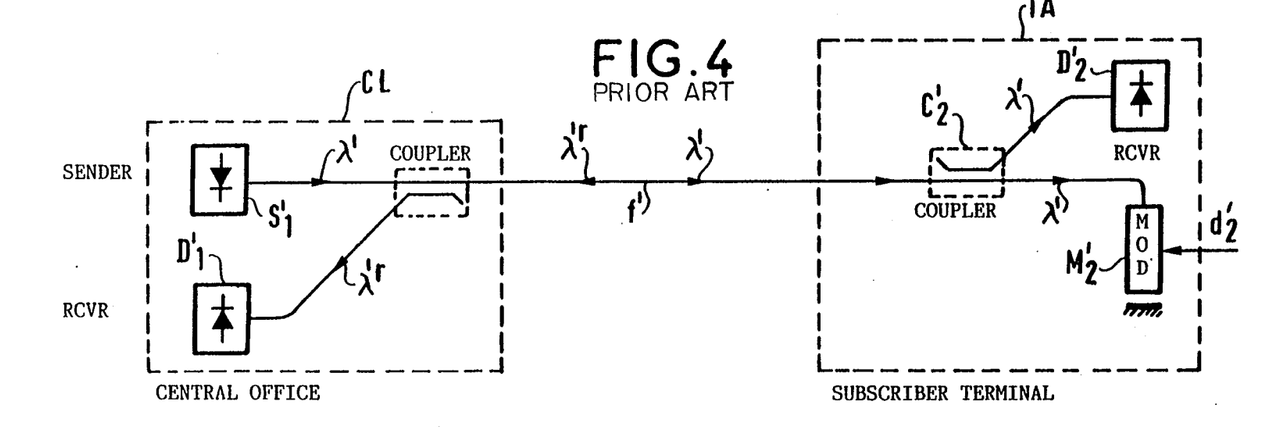
FIG. 4 is a diagram of a prior art bidirectional transmission system utilizing a single optical carrier.

A single optical source included in a sender $S'_1$ at the central office is used for simultaneous bidirectional transmission between the central office and a subscriber terminal. For transmission in the downward direction the carrier from the optical source is amplitude modulated, the resulting light signal is transmitted over a fiber f' and some of the light, sampled by a coupler $C'_2$, is detected at the subscriber terminal by the receiver $D'_2$. For transmission in the upward direction the subscriber uses a directional coupler type modulator $M'_2$ to superimpose his signal $d'_2$ on the non-detected part of the light used for transmission in the downward direction from the coupler $C'_2$. The resulting optical carrier is reflected by a mirror for transmission to the central office at the same wavelength $\lambda'$ now denoted $\lambda'^r$ (r=reflected) via the same fiber f'. To enable the central office to reconstitute the signal $d'_2$ sent by the subscriber, the transmission bit rate in the upward direction must be lower than that in the downward direction, however, so this technique cannot be used to transmit data at the same bit rate in both directions. Another drawback of this technique is that, in the case of data transmitted in digital code, the information conveyed in the downward direction must be coded to avoid long sequences of zero values during which the subscriber could not send (because he would not be receiving any light).

SUMMARY OF THE INVENTION

A particular object of the present invention is to provide a bidirectional transmission system using a single carrier for both transmission directions enabling simultaneous transmission in both directions and which is free of the above mentioned drawbacks.

The present invention consists in a bidirectional transmission system, especially one using optical fiber, between a source terminal and a user terminal employing a single carrier for both transmission directions obtained from a source in the source terminal characterized in that it comprises for each transmission direction means for modulating one parameter of said carrier, this parameter being intensity for both of the two directions subject in all cases to the condition that for the modulation applied first for transmission in the downward direction from the source terminal to the user terminal, the depth of modulation is sufficiently small to always leave sufficient power for application of the second modulation for transmission in the upward direction from the user terminal to the source terminal.

BRIEF DESCRIPTION OF THE DRAWINGS

Other objects and features of the present invention will emerge from the following description of embodiments of the invention given with reference to the appended drawings wherein.

DESCRIPTION OF THE PREFERRED EMBODIMENTS

In a first embodiment of the invention simultaneous bidirectional transmission using a single optical carrier between a source terminal including an optical source providing said carrier and a user terminal is obtained by modulating the intensity of said carrier for transmission in both directions, namely the downward direction (from the source terminal to the user terminal) and the upward direction (from the user terminal to the source terminal), the modulation applied for transmission in the downward direction being effected between a low level Pb relatively far from the zero level and a high level Ph and the modulation applied for transmission in the upward direction being effected between a level Po near the zero level and the level Pb, in other words on the light emitted by the optical source which was not modulated for transmission in the downward direction.

The modulation for transmission in the downward direction is direct modulation of the intensity of said carrier, for example.

Figure 6:
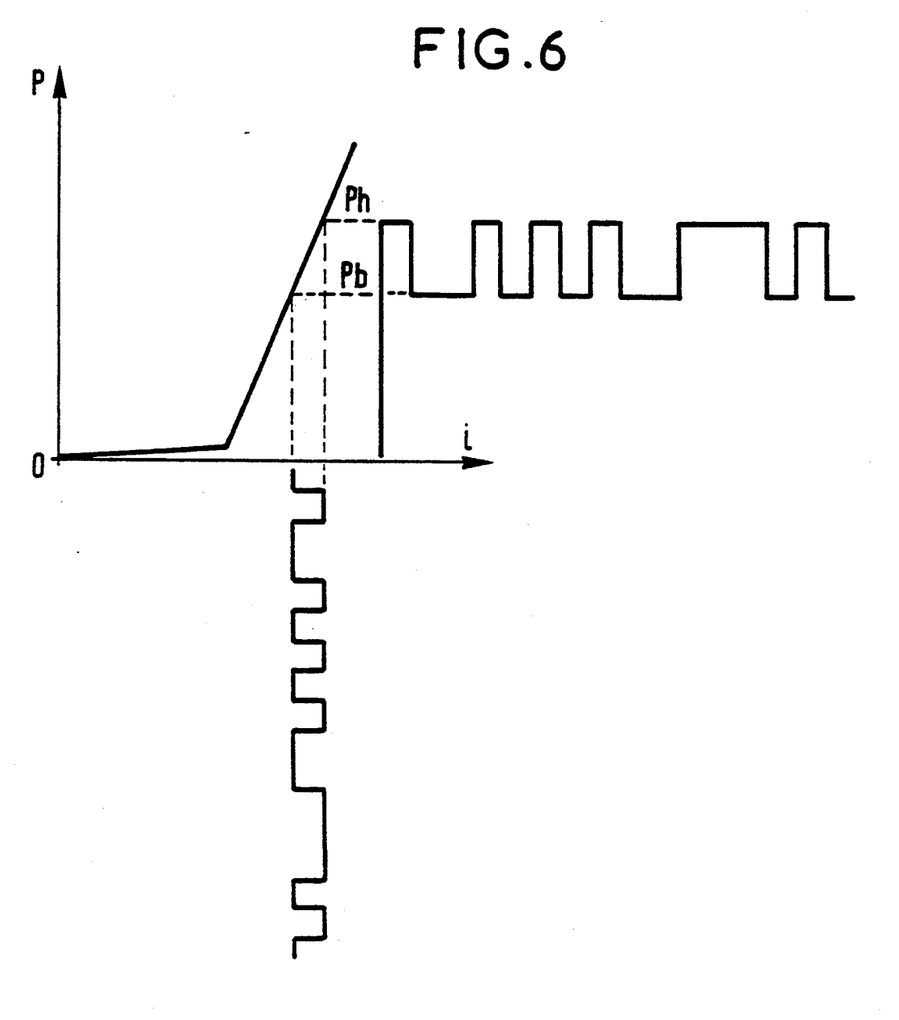
FIG. 6 summarizes the mechanism for direct modulation of the intensity of an optical carrier from an optical source such as a laser diode by a digital modulated signal, such modulation being used, in this first embodiment, for transmission from the source terminal to the user terminal.

FIG. 6 shows how an optical signal of this kind is generated by direct modulation. The diagram shows the general shape of the output optical power characteristic of an optical source such as a laser diode as a function of its control current "i" and the timing diagram of the output optical power, in this example for a digital control current comprising the sequence 1001010100111010, for example, in this instance with modulation applied between the levels Pb and Ph as defined above.

Figure 5:
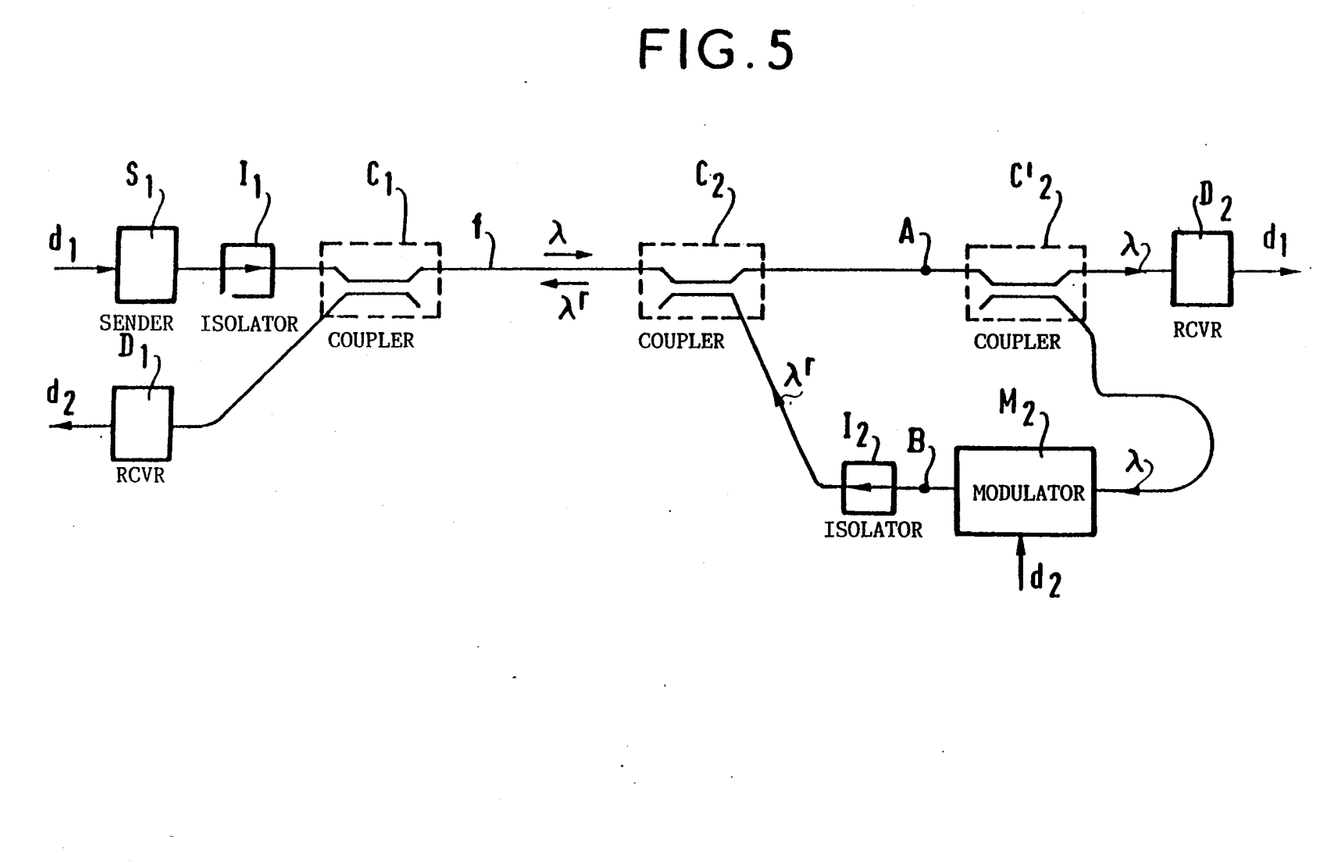
FIG. 5 is a diagram of a transmission system in accordance with a first embodiment of the invention.

As shown in FIG. 5, in this first embodiment the source terminal equipment comprises:

an optical sender $S_1$ including an optical source such as a laser diode emitting at a wavelength $\lambda$ and provided with a control input for application of an intensity modulation signal $d_1$, in this instance a direct modulation signal, to be transmitted in the downward direction, an optical receiver $D_1$ for detecting a modulation signal $d_2$ transmitted in the upward direction, a passive coupler $C_1$ enabling a single fiber f to be used for both transmission directions and three ports of which are respectively connected to the output of the sender $S_1$, to the input of the receiver $D_1$ and to one end of the fiber f, an optical isolator $I_1$ which protects the output of the optical sender $S_1$ from the light received by the source terminal.

As also shown in FIG. 5, in this first embodiment the user terminal equipment comprises:

a first passive coupler $C_2$ enabling a single fiber to be used for both transmission directions, a second passive coupler $C''_2$ enabling part of the received optical carrier to be sampled so that the message $d_1$ that it conveys in the downward direction can be detected by an optical receiver $D_2$ of this terminal, the other part being intended to be modulated by the message $d_2$ to be sent by the user terminal and returned to the source terminal, still at the wavelength $\lambda$ but now denoted $\lambda^r$ (r=relayed), modulation means $M_2$, for example an electro-optical component of the intensity modulator or semiconductor optical amplifier type which receives said part intended to be modulated from the coupler $C''_2$ and an intensity modulation control signal embodying the data $d_2$ to be sent by the user terminal, an optical isolator $I_2$ which protects the output of the modulator $M_2$ from the light received by the user terminal, the optical receiver $D_2$ for detecting the signal sent in the downward direction, restoring the data $d_1$ sent by the source terminal.

The coupler $C''_2$ has a first port connected to a second port of the coupler $C_2$, a second port connected to the optical receiver $D_2$ and a third port connected to an input of the modulation means $M_2$, as mentioned above.

The isolator $I_2$ has a port connected to the output of the modulation means $M_2$ and a port connected to a third port of the coupler $C_2$.

The coupler $C_2$ has a first port connected to one end of the fiber f.

Note that the user terminal equipment is relatively simple, comprising an optical receiver, a modulator and a limited number of passive optical components.

Figure 7A:
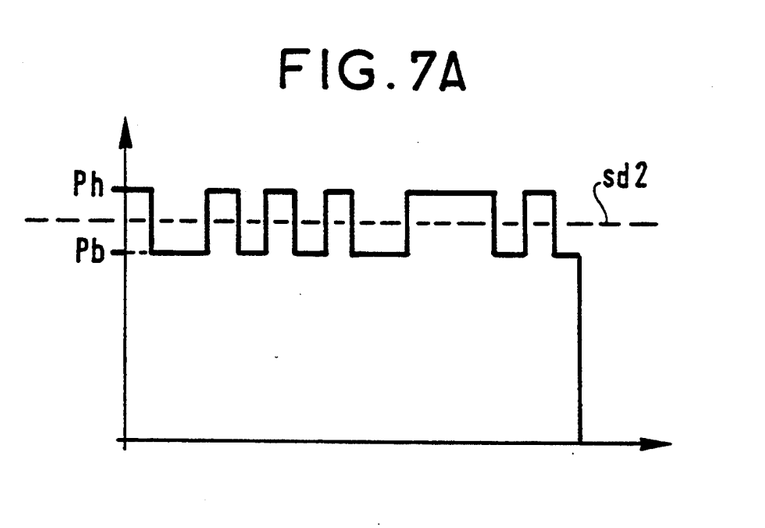
FIGS. 7A and 7B are respectively timing diagrams for the optical power received and the optical power retransmitted by the user terminal in this first embodiment.

FIG. 7A shows the timing diagram of the optical signal at the point A in FIG. 5, in other words the optical power received by the detector which in this instance comprises the receiver $D_2$ of the user terminal. As shown in this figure, the decision threshold $sd_2$ of this receiver is advantageously set to a value substantially equal to half the sum of the level values $P_b$ and $P_h$.

Figure 7B:
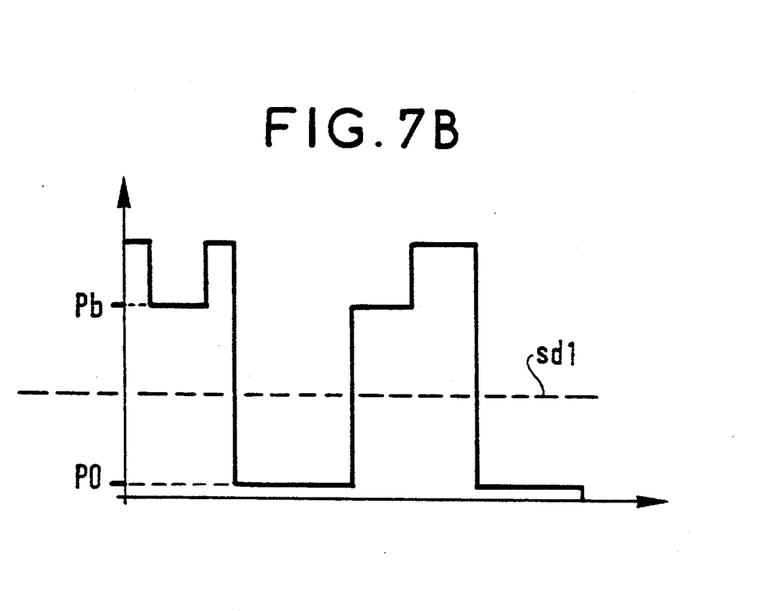

FIG. 7B shows the timing diagram of the optical signal at the point B in FIG. 5, in other words at the output of the send modulator $M_2$ of the user terminal equipment. As shown in this figure, the decision threshold $sd_1$ of the receiver $D_1$ of the source terminal is advantageously set to a value equal to half the sum of the level values $P_o$ and $P_b$.

In a second embodiment of the invention simultaneous bidirectional transmission by means of a single optical carrier is achieved by the use of frequency modulation for transmission in the downward direction, in this instance CPFSK type modulation (Continuous Phase Frequency Shift Keying), and intensity modulation for transmission in the upward direction.

Figure 8:
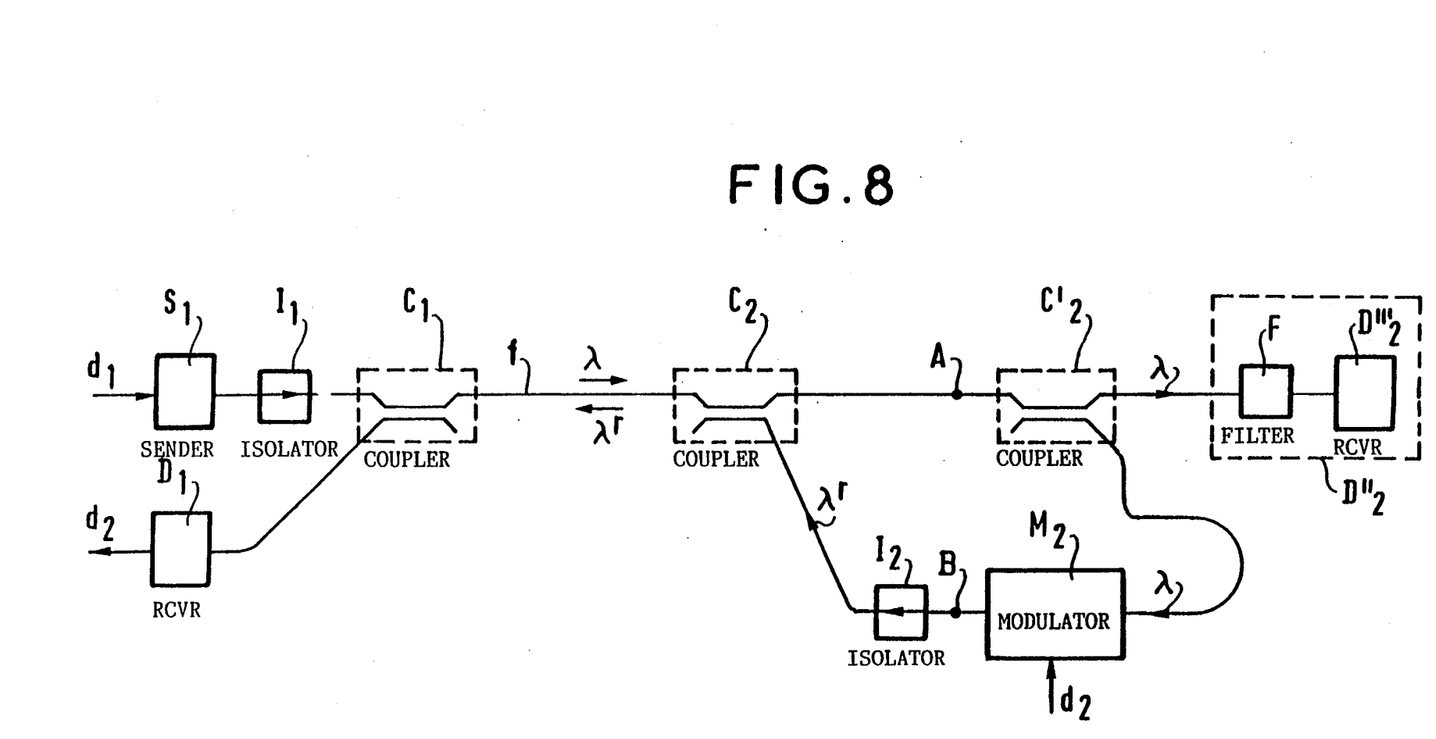
FIG. 8 is a diagram showing a transmission system in a second embodiment of the invention.

FIG. 8 shows the source terminal equipment and the user terminal equipment in this embodiment. They differ from those shown in FIG. 5 only in that the control input of the optical sender is a control input for application of a frequency modulation signal and in that the receiver $D''_2$ comprises a filter F preceding a detector $D'''_2$. An FSK signal is usually demodulated by heterodyne detection. However, an optical filter having an appropriate bandwidth centered on one of the two peaks of the modulated signal power spectrum (the modulating signal being a binary signal)—see FIG. 9—enables conversion from FSK modulation to ASK (or intensity) modulation and subsequent demodulation of the signal by direct detection.

Figure 10A:
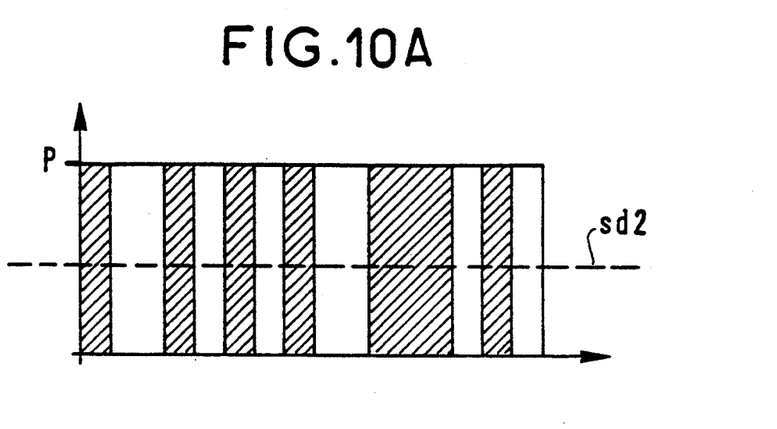
FIGS. 10A and 10B are respectively timing diagrams for the optical power received and the optical power retransmitted by the user terminal in this second embodiment.

FIG. 10A shows the timing diagram of the optical signal at the point A in FIG. 8, in other words the optical power received by the receiver $D''_2$ of the user terminal. As shown in this figure, the optical power at this point remains constant at a level P.

Figure 9:
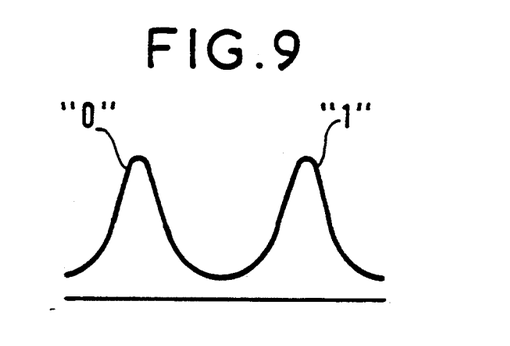
FIG. 9 shows the waveform of a frequency modulated signal used in this second embodiment to transmit from the source terminal to the user terminal.

The frequency modulation employed is, for example, modulation by a binary signal in which case the spectrum of the modulated signal in the case of a data bit of value "1" in the modulating signal is merely offset in frequency relative to that obtained in the case of a data bit of value "0", as diagrammatically shown in FIG. 9.

In FIG. 10A these various data bits are identified by areas that are shaded or unshaded according to the value of the bits.

The user's terminal equipment in this example applies to the CPFSK modulated optical carrier intensity modulation between the optical power levels Po and P. This equipment therefore modulates the total optical power output by the source terminal optical source.

Figure 10B:
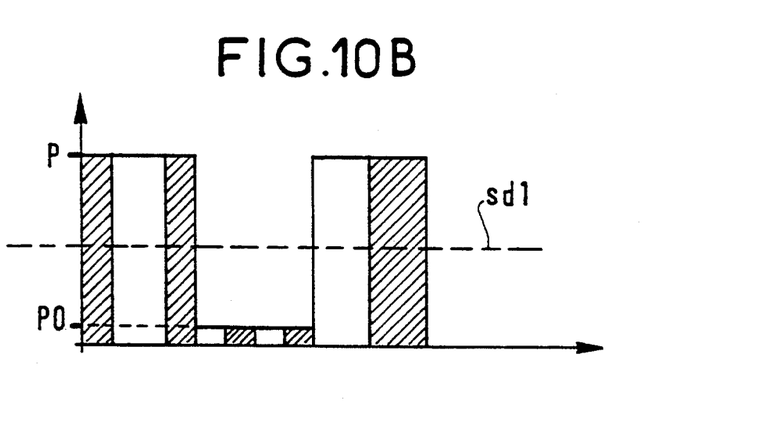

FIG. 10B shows the timing diagram of the optical signal at the output of the user terminal equipment modulator, in other words at point B in FIG. 8, In this embodiment the thresholds $sd_1$ and $sd_2$ of the receivers $D_1$ and $D''_2$ may be identical, as shown in FIG. 10B.

Note that for the two examples of modulation given for transmission in the downward direction long sequences of data bits of value "0" do not prevent the subscriber sending to the source terminal. This applies even if there is no transmission (when there is no data to be sent from the source terminal to the user terminal).

Note also that the modulation examples described above are merely examples and that any parameter of the optical carrier supplied by the source terminal (intensity, frequency, phase, polarization, etc) could be modulated provided that this parameter is different for the two transmission directions (except for the intensity, which can be the same in both cases) and subject in all cases to the condition that if the modulation applied first, for transmission from the source terminal to the user terminal, is intensity modulation, the depth of modulation is sufficiently small to always leave sufficient power for application of the second modulation for transmission from the user terminal to the source terminal.

Note that irrespective of the type of modulation employed, the modulating signals can be either digital or analog signals.

Note also that in the case of digital modulating signals it is not necessary for the bit rate of the modulating signal applied second to be less than that of the modulating signal applied first and in particular that the bit rates of these two modulating signals can be the same.

We claim:

1. Bidirectional transmission system, employing a transmission medium, between a source terminal and a user terminal employing a single carrier for both transmission directions obtained from a source in said source terminal, said system comprising means within said source terminal for applying a first intensity modulation to said carrier to provide a signal for transmission in a downward direction from said source terminal to said user terminal, and means within said user terminal for applying a second intensity modulation for transmission in an upward direction from said user terminal to said source terminal, subject in all cases to the condition that for said first intensity modulation, the depth of modulation is sufficiently small to always leave sufficient power for application of said second intensity modulation wherein said user terminal comprises means for separating said signal received from said source terminal into first and second parts each including said first intensity modulation; means for detecting said first intensity modulation in said first part; and means for applying said second intensity modulation to said second part and for transmitting the intensity modulated second part in said upward direction over said transmission medium.

2. System according to claim 1 characterized in that it comprises a single transmission medium for transmission in both directions.

3. System according to claim 1 characterized in that the first intensity modulation applied for transmission in the downward direction is effected so that it appears in said first part between a low level Pb relatively far from the zero level and a high level Ph, the second intensity modulation applied for transmission in the upward direction is effected upon said second part between a level Po near the zero level and the level Pb, the decision threshold ($sd_2$) of the optical receiver of the user terminal is adjusted to a value substantially equal to half the sum of the level values Pb and Ph and the decision threshold ($sd_1$) of the optical receiver of the source terminal is adjusted to a value substantially equal to half the sum of the level values Po and Pb.

4. System according to claim 1 wherein said transmission medium is an optical fiber.

5. System according to claim 1 wherein said first intensity modulation and said second intensity modulation are at substantially the same bit rate.

* * * * *